United States Patent [19]

Miyazawa et al.

[11] 4,414,245
[45] Nov. 8, 1983

[54] PROCESS FOR PRODUCING COBALT CONTAINING FERROMAGNETIC IRON OXIDES

[75] Inventors: Kokichi Miyazawa, Suzuka; Kazuo Nakata, Moriyama; Tsuneo Ishikawa, Moriyama; Ichiro Honma, Moriyama; Arata Koyama, Moriyama; Masatoshi Amano, Moriyama, all of Japan

[73] Assignee: Ishihara Sangyo Kaisha, Ltd., Osaka, Japan

[21] Appl. No.: 401,214

[22] Filed: Jul. 23, 1982

[30] Foreign Application Priority Data

| Jul. 28, 1981 | [JP] | Japan | 56-117945 |
| Oct. 7, 1981 | [JP] | Japan | 56-159620 |
| Nov. 20, 1981 | [JP] | Japan | 56-186453 |
| Dec. 15, 1981 | [JP] | Japan | 56-201958 |

[51] Int. Cl.$^3$ .................. C01G 49/06; B05D 5/12
[52] U.S. Cl. ..................... 427/127; 252/62.56; 427/130
[58] Field of Search ............. 252/62.56; 427/127, 427/128, 130

[56] References Cited

U.S. PATENT DOCUMENTS

| 3,725,126 | 4/1973 | Haller et al. | 252/62.56 X |
| 4,122,216 | 10/1978 | Okazoe | 252/62.56 X |
| 4,188,302 | 2/1980 | Becker et al. | 252/62.56 |
| 4,287,233 | 9/1981 | Rudolf et al. | 252/62.56 X |

FOREIGN PATENT DOCUMENTS

| 54-106895 | 8/1979 | Japan | 252/62.56 |
| 721630 | 1/1965 | United Kingdom . |
| 1392980 | 5/1975 | United Kingdom . |
| 1418733 | 12/1975 | United Kingdom . |
| 1589355 | 5/1981 | United Kingdom . |

OTHER PUBLICATIONS

"Funtai Oyobi Funmatsu Yakin," vol. 13, No. 3, pp. 20–25.

Primary Examiner—Jack Cooper
Attorney, Agent, or Firm—Cushman, Darby & Cushman

[57] ABSTRACT

A process which comprises coating a cobalt compound or a combination of a cobalt compound and a ferrous compound on the surface of magnetic iron oxide particles and then heating the coated particles in the presence of water vapor. The cobalt containing ferromagnetic iron oxide produced by this process is excellent in coercivity and thermal stability. Further, magnetic tape produced from this iron oxide has a high coercivity and is excellent in squareness, orientability and remanent induction.

8 Claims, No Drawings

PROCESS FOR PRODUCING COBALT CONTAINING FERROMAGNETIC IRON OXIDES

FIELD OF THE INVENTION

This invention relates to a process for producing a cobalt containing ferromagnetic iron oxide useful as media for magnetic recording.

DESCRIPTION OF THE PRIOR ART

Cobalt containing magnetic iron oxides have a high coercivity. Magnetic tapes produced therefrom have an ability of high densed recording and are excellent in sensibility in the high frequency region, so that they are largely utilized recently in the field of acoustic signals, visible images or other types of information. A number of processes have hitherto been proposed for incorporating cobalt into magnetic iron oxide. They are, for example, (1) a process of treating $\gamma$-$Fe_2O_3$ powder in a solution containing a cobalt salt at a specified $(OH)^-$ concentration, at a temperature of 50°–100° C. and in a non-oxidative atmosphere (Japanese Patent Publication No. 24,238/77), (2) a process which comprises coating magnetic iron oxide with a cobalt compound followed by heat-treating it at a temperature of about 400° C. (Japanese Patent Publication No. 10,994/73), (3) a process of subjecting magnetic iron oxide powder to a hydrothermal reaction in an alkaline solution containing a cobalt salt at a temperature of 120°–200° C. (Japanese Patent Publication No. 44,040/73), etc. However, according to process (1), epitaxial reaction rapidly progresses, so that the distribution of coercivity is apt to become broad. According to process (2), cobalt ions diffuse into the inner part of magnetic iron oxide, so that the product obtained is unsatisfactory in stability under heating (thermal stability) and under aging. According to process (3), the surface of magnetic iron oxide is partially dissolved and roughened by the alkaline solution and, in addition, epitaxial reaction rapidly progresses to give a broad distribution of coercivity. Because of these faults, improvement for the above-mentioned processes is desired.

On the other hand, a technique for forming a ferrite by treating coprecipitates of ferrite-forming components or wet/dry mixture of the ferrite-forming precipitates in the presence of water vapor is reported in "Funtai Oyobi Funmatsu Yakin," Vol. 13, No. 3, pp. 20–25. However, there has never been reported any case of treating a cobalt compound-coated magnetic iron oxide in the presence of water vapor.

SUMMARY OF THE INVENTION

The process of this invention differs from any of the prior processes in that a cobalt compound or a combination of a cobalt compound and a ferrous compound is coated on the surface of magnetic iron oxide and then it is heat-treated in the presence of water vapor. The coblat containing ferromagnetic iron oxide obtained by the process of this invention is excellent in coercivity and thermal stability. Further, magnetic tapes produced from it have a high coercivity and also they are excellent in squareness, orientability and remanent induction.

This invention provides a process for producing a cobalt containing ferromagnetic iron oxide characterized by treating a magnetic iron oxide particles with an aqueous solution of a cobalt salt and an alkali to coat a cobalt compound on the surface of the particles or with an aqueous solution of a cobalt salt, an aqueous solution of a ferrous salt and an alkali to coat a combination of a cobalt compound and a ferrous compound on the surface of the particles and then heat-treating the particles in the presence of water vapor.

DETAILED DESCRIPTION OF PREFERRED EMBODIMENTS

The magnetic oxides usable in this invention include $\gamma$-$Fe_2O_3$, $Fe_3O_4$, berthollide compound obtained by partially reducing $\gamma$-$Fe_2O_3$ and the like. As the cobalt salt to be used for treating, cobalt sulfate, cobalt chloride, cobalt acetate and the like can be used. As the ferrous salt, ferrous chloride, ferrous sulfate and the like can be used. Optionally, a salt of a transition metal such as Mn, Zn, Cr, Ni and the like may be coated additionally. As the alkali, sodium hydroxide, potassium hydroxide and the like can be used. As examples of the cobalt compound and ferrous compound, hydrated hydroxides, hydrated oxides, hydrated oxyhydroxides and the like of cobalt or iron can be referred to.

As the process for coating the compound of a metal such as cobalt or iron, (1) a process of dispersing magnetic iron oxide into an aqueous solution of a metallic salt and adding a solution of alkali thereto, (2) a process of dispersing magnetic iron oxide into a mixture of an aqueous solution of a metallic salt and an aqueous solution of alkali, (3) a process of dispersing magnetic iron oxide into water and adding an aqueous solution of a metallic salt and a solution of alkali thereto, (4) a process of dispersing a magnetic iron oxide into an aqueous solution of alkali and adding an aqueous solution of a metallic salt thereto, (5) a process of dispersing a magnetic iron oxide into an aqueous solution of a metallic salt and dropwise adding the dispersion to a solution of alkali, and so on can be used. These processes may be employed appropriately.

As the process for treating the metallic salt such as a cobalt salt, ferrous salt and the like, a process of treating a part or the whole of the metals simultaneously or a process of treating them successively can be referred to. At any rate, said alkali is added at least in an amount equivalent to the metallic salt present in the dispersion.

The coating treatment is carried out at a temperature not higher than the boiling point and preferably at a temperature of 10°–50° C., and the stirring is continued until the reaction is completed, whereby the metallic compounds such as a cobalt compound, ferrous compound and the like are coated on the surface of the magnetic iron oxide particles. If the temperature is too low during the coating, a long period of time is necessary for obtaining the intended coercivity. If the temperature is too high, the distribution of coercivity will become broad, which is undesirable. The time period of the treatment is usually 0.1–3 hours. The coating treatment is preferably carried out in a non-oxidative atmosphere. After completion of the coating treatment, the coated magnetic iron oxide is usually subjected to curing in a non-oxidative atmosphere at a temperature not higher than boiling point, preferably at a temperature not higher than 50° C. The time period of this curing is usually 0.5–10 hours. The amount of cobalt coated is about 0.5–30%, preferably about 1–10% on the basis of Co, the amount of ferrous iron coated is 1–30%, preferably 2–20% on the basis of Fe, and the amount of other metals coated is 0–about 10%, wherein all the percentages are percent by weight based on the iron oxide. Herein, the term "non-oxidative atmosphere" means an atmosphere causing no substantial oxidation of cobalt and iron, because the oxidation of cobalt and iron make it particularly difficult to obtain the intended coercivity. Preferably, such a non-oxidative atmosphere is conditioned by bubbling an inert gas into the liquid reaction mixture or by replacing the air in the reaction vessel with an inert gas.

Subsequently, in the process of this invention, a magnetic iron oxide slurry subjected to the abovementioned treatment is usually filtered and then washed with water to obtain a wet cake, and the wet cake is directly heat-treated in the presence of water vapor. In this process, after the washing with water the cake may be dried in a non-oxidative atmosphere at as low a temperature as possible. The temperature at which this heat-treatment in the presence of water vapor is carried out is usually 60°–300° C., preferably 60°–250° C., further preferably 80°–180° C. and particularly preferably 80°–150° C. If this temperature is too low, the intended effect cannot be obtained. If it is too high, magnetic tapes produced therefrom are inferior in squareness and orientability, which is undesirable. This treatment is carried out usually for 1–50 hours. Herein, the term "treatment in the presence of water vapor" usually means a treatment in a state that partial pressure of water vapor is 0.2 atm or more and preferably 0.4 atm or more. More preferably, it means a treatment under s saturated water vapor pressure at that temperature. If partial pressure of water vapor is less than 0.2 atm, the effect of this invention cannot be achieved. Further, in this invention, the term "heat-treatment in the presence of water vapor" means a treatment for heating the material in the presence of water vapor in a sealed vessel such as an autoclave or in an open type tube furnace filled with nitrogen gas, as well as a treatment which comprises drying the material at a low temperature and then heating it in contact with hot water vapor in a fluidized bed, and the like. Said treatment may be carried out together with pulverization by means of a high-speed fluid energy mill or the like. Among these treatments, a treatment which comprises heating the material under the saturated water vapor pressure in a sealed vessel filled with nitrogen gas is most preferable. Optionally, the heat-treatment in the presence of water vapor may be carried out under an elevated pressure (for example, 1.5 atm or more) of an inert gas (for example, nitrogen gas). It is also allowable to carry out the treatment in the presence of a small amount of other gas such as air, hydrogen chloride gas, ethylene chlorohydrin and the like.

By subjecting the cobalt containing ferromagnetic iron oxide obtained by the above-mentioned process to an additional heat-treatment in a non-oxidative atmosphere, there can be obtained a product which is more excellent in magnetic characteristics, particularly in coercivity. A marked effect on coercivity can be achieved when this heat-treatment is carried out with a product coated at a temperature of 50° C. or below with a metallic compound such as a cobalt compound. The temperature of this heat-treatment is usually 100°–300° C., preferably 130°–250° C. This treatment in a non-oxidative atmosphere may be practised in an atmosphere in which no substantial oxidation progresses at that temperature, for example, of inert gas such as nitrogen, helium, argon or the like) or in vacuum. When a cobalt compound alone is coated, a reductive atmosphere in which cobalt containing magnetic iron oxide is not reduced or is reduced only to a small extent is preferable. In a concrete example, nitrogen gas containing a certain percentage of hydrogen gas is used as the reductive atmosphere. Usual drying may be carried out prior to this heat-treatment.

The cobalt containing ferromagnetic iron oxide obtained by the process of this invention is excellent in coercivity, thermal stability, etc. Further, magnetic tapes produced therefrom are excellent in coercivity, squareness, orientability, remanent induction, etc. Though the reasons for these facts are not yet known fully, the following can be considered. Thus, when a cobalt compound and a ferrous compound are coated, a layer of both compounds is formed on the surface of magnetic iron oxide particles, then by the heat-treatment in the presence of water vapor the layer is moderately and uniformly crystalized, subsequently a uniform growth of the crystal is promoted so that a stabilization of the cobalt containing ferromagnetic iron oxide may be brought about. Further, by the subsequent heat-treatment, the cobalt containing ferromagnetic iron oxide is more stabilized.

In this invention, the term "thermal stability" means temperature dependence of coercivity which can be calculated according to the following equation:

Thermal stability $(T_p; \%) =$ $$\frac{\text{Coercivity at } 125° \text{ C.}}{\text{Coercivity at room temperature}} \times 100$$

Further, the value "stability under aging" is calculated according to the following equation:

Stability under aging $(\Delta H_c; \text{Oe}) =$ $$(\text{Initial coercivity}) - \left( \begin{array}{l} \text{Coercivity after stand-} \\ \text{ing for 10 days at } 60° \text{ C.} \\ \text{at a relative humidity} \\ \text{of } 80\% \end{array} \right)$$

EXAMPLE 1

100 grams of acicular $\gamma$-$Fe_2O_3$ ($H_c$ 393 Oe) was dispersed into 1 liter of water to obtain a slurry. While blowing nitrogen gas into the slurry, 60 ml of a solution containing 1 mole/liter of cobalt sulfate was added, and then 388 ml of a solution containing 5 moles/liter of sodium hydroxide was added. After stirring the mixture, 125 ml of a solution containing 1 mole/liter of ferrous sulfate was added, and the resulting mixture was stirred at room temperature (28° C.) for 5 hours. After the reaction, the slurry was filtered and washed with water. The cake thus obtained was placed in an autoclave together with water placed in another vessel. After replacing the inner atmosphere of the autoclave with nitrogen gas and sealing, a heat-treatment was carried out at 80° C. for 18 hours under saturated water vapor pressure. Then, the treated product was dried at 60° C. to obtain the intended magnetic powder (A).

EXAMPLE 2

Intended magnetic powder (B) was produced in accordance with the same procedure as in Example 1, except that the heat-treatment under saturated water vapor pressure was carried out at 90° C. instead of 80° C.

EXAMPLE 3

Intended magnetic powder (C) was produced in accordance with the same procedure as in Example 1, except that the heat-treatment under saturated water vapor pressure was carried out at a pressure of 5 atms by introducing nitrogen gas.

COMPARATIVE EXAMPLE 1

A magnetic powder (D) was produced by filtering the reacted slurry obtained in Example 1, washing it with water and drying the cake thus obtained in the air at 60° C. for 12 hours.

COMPARATIVE EXAMPLE 2

A magnetic powder (E) was produced by filtering the reacted slurry obtained in Example 1, washing it with water, drying the cake thus obtained in the air at 60° C. for 12 hours and then heat-treating it at 230° C. for an hour in the atmosphere of nitrogen gas.

On the magnetic powder (A)–(E) obtained in the above-mentioned Examples 1–3 and Comparative Examples 1–2, coercivity was measured by a conventional method. Then, they were made into the formulations described below and kneaded with a ball mill to obtain magnetic coating materials.

| (1) Magnetic powder | 100 parts by weight |
|---|---|
| (2) Soybean lecithin | 1 parts by weight |
| (3) Surfactant | 4 parts by weight |
| (4) Vinyl chloride-vinyl acetate copolymer resin | 15 parts by weight |
| (5) Dioctyl phthalate | 5 parts by weight |
| (6) Methyl ethyl ketone | 111 parts by weight |
| (7) Toluene | 122 parts by weight |

Then, each magnetic coating material was coated on a polyester film by a conventional method, oriented and dried to obtain a magnetic tape having a magnetic coating film with a thickness of about $9\mu$. On each of the tapes, coercivity ($H_c$), squareness ($B_r/B_m$), orientability (OR) and remanent induction ($B_m$) were measured by conventional methods to obtain the results shown in Table 1.

TABLE 1

| | Powder | Measurements on tape | | | |
|---|---|---|---|---|---|
| Sample No. | $H_c$ (Oe) | $H_c$ (Oe) | $B_r/B_m$ | OR | $B_m$ (Gauss) |
| Example 1 | A | 620 | 645 | 0.84 | 2.26 | 1,735 |
| Example 2 | B | 628 | 653 | 0.82 | 2.16 | 1,710 |
| Example 3 | C | 610 | 605 | 0.82 | 2.42 | 1,736 |
| Comparative Example 1 | D | 581 | 591 | 0.80 | 1.89 | 1,560 |
| Comparative Example 2 | E | 597 | 604 | 0.81 | 1.85 | 1,600 |

EXAMPLE 4

A slurry was prepared by dispersing 100 g of acicular $\gamma$-Fe$_2$O$_3$ [coercivity ($H_c$):402 Oe] into 1 liter of water. While blowing nitrogen gas into the dispersion, a mixture of 60 ml of a solution containing 1 mole/liter of cobalt sulfate and 150 ml of a solution containing 1 mole/liter of ferrous sulfate was added and stirred. Then, 399 ml of a solution containing 5 moles/liter of sodium hydroxide was added, and the stirring was continued at room temperature (28° C.) for 5 hours. After the reaction, the slurry was filtered and washed with water, and the wet cake obtained was placed in an autoclave together with water placed in another vessel. After replacing the inner atmosphere of the autoclave with nitrogen gas and sealing, and the cake was treated under saturated water vapor pressure at 150° C. for 6 hours. After the treatment, it was dried at 60° C. to obtain the intended magnetic powder (F).

COMPARATIVE EXAMPLE 3

A magnetic powder (G) was produced in accordance with the same procedure as in Example 4, except that the treatment in the presence of water vapor was replaced with a heating at 230° C. for 1 hour in an atmosphere or nitrogen gas.

COMPARATIVE EXAMPLE 4

A magnetic powder (H) was produced in accordance with the same procedure as in Example 4, except that the reacted slurry of Example 4 was introduced into an autoclave and subjected to the hydrothermal treatment at 140° C. for 5 hours.

On the magnetic powders F, G and H thus obtained, coercivity ($H_c$), thermal stability ($T_p$) and stability under aging ($\Delta H_c$) were measured to obtain the results shown in Table 2.

TABLE 2

| | Sample No. | $H_c$ (Oe) | $T_p$ (%) | $\Delta H_c$ (Oe) |
|---|---|---|---|---|
| Example 4 | F | 656 | 81 | 2 |
| Comparative Example 3 | G | 602 | 74 | 7 |
| Comparative Example 4 | H | 671 | 72 | 7 |

It is apparent from Table 2 that the ferromagnetic powder produced by the process of this invention is excellent in coercivity, thermal stability and stability under aging. Further, electro-acoustic properties were also measured to reveal that the ferromagnetic powder which has been subjected to the heat-treatment in the presence of water vapor according to the process of this invention was superior to the ferromagnetic powder of Comparative Example 4 (powder H) subjected to the hydrothermal treatment in frequency response, noise, print-through and erasing.

EXAMPLE 5

A ferromagnetic powder was produced in accordance with the same procedure as in Example 4, except that the temperature of acicular $\gamma$-Fe$_2$O$_3$ slurry was altered to 60° C. when a cobalt salt and a ferrous salt were added and the conditions of the stirring were altered to 3 hours at 90° C. after addition of alkali. Measurement of its magnetic characteristics gave the following results: $H_c$=611 Oe, $T_p$=80%, $\Delta H_c$=6 Oe.

EXAMPLES 6–8

A slurry was prepared by dispersing 100 g of acicular $\gamma$-Fe$_2$O$_3$ [coercivity ($H_c$):393 Oe] into a mixture of 1 liter of water and 60 ml of a solution containing 1 mole/liter of cobalt sulfate. While blowing nitrogen gas into the dispersion and stirring it, 24 ml of a solution containing 5 moles/liter of sodium hydroxide was added over a period of one hour and thereafter 271 ml of a solution containing 5 moles/liter of sodium hydroxide was added in 0.5 hour. Then, the mixture was stirred at room temperature (28° C.) for 5 hours. After the reaction, the slurry was filtered and washed with water, and the wet cake thus obtained was placed in an autoclave together with water placed in another vessel. After replacing the inner atmosphere of the autoclave with nitrogen gas and sealing, and the cake was treated under saturated water vapor pressure. Temperature and period of the treatment were as shown in the following Table 3. Thus, intended magnetic powder (I)–(K) were obtained.

On these samples (I)–(K), coercivity and thermal stability were measured by conventional methods to obtain the results shown in Table 3.

TABLE 3

| Sample No. | Heating in the presence of water vapor | | $H_c$ (Oe) | $T_p$ (%) |
|---|---|---|---|---|
| | Temperature (°C.) | Period (hour) | | |
| Example 6 | I | 90 | 6 | 507 | 80 |
| Example 7 | J | 120 | 6 | 522 | 81 |
| Example 8 | K | 150 | 6 | 555 | 81 |

COMPARATIVE EXAMPLE 5

A magnetic powder (L) was produced in accordance with the same procedure as in Example 6, except that the heat-treatment in the presence of water vapor at 90° C. for 6 hours was replaced with a drying at 60° C. for 15 hours. Measurement of its magnetic characteristics gave the following results: $H_c=435$ Oe, $T_p=83\%$.

EXAMPLE 9

A slurry was prepared by dispersing 100 g of the same acicular $\gamma$-Fe$_2$O$_3$ as used in Example 6 into a mixture of 1 liter of water and 295 ml of a solution containing 5 mole/liter of sodium hydroxide. While blowing nitrogen gas into the dispersion and stirring it, 60 ml of a solution containing 1 mole/liter of cobalt sulfate was added over a time period of one hour. Then the mixture was stirred at room temperature (28° C.) for a continued 5 hours. After the reaction, the slurry was filtered and washed with water, and the cake thus obtained was placed in a vessel. It was placed in an autoclave together with water placed in another vessel. After replacing the inner atmosphere of the autoclave with nitrogen gas and sealing, and the cake was treated under saturated water vapor pressure at 150° C. for 6 hours to obtain the intended magnetic powder (M). Measurement of its magnetic characteristics gave the following results: $H_c=548$ Oe, $T_p=81\%$.

EXAMPLE 10

A slurry was prepared by dispersing 100 g of acicular $\gamma$-Fe$_2$O$_3$ [coercivity ($H_c$): 393 Oe] into 1 liter of water. While blowing nitrogen gas into the dispersion and stirring it, 60 ml of a solution containing 1 mole/liter of cobalt sulfate and 24 ml of a solution containing 5 moles/liter of sodium hydroxide were added over a time period of one hour, after which 271 ml of a solution containing 5 moles/liter of sodium hydroxide was added in 0.5 hour. Then the stirring was continued at room temperature (28° C.) for 5 hours. After the reaction, the slurry was filtered and washed with water, and the wet cake thus obtained was placed in an autoclave together with water placed in another vessel. After replacing the inner atmosphere of the autoclave with nitrogen gas and sealing, and the cake was treated under saturated water vapor pressure at 150° C. for 6 hours. Subsequently, the treated material was placed in a tube furnace and heat-treated at 230° C. for 1 hour while blowing nitrogen gas containing 5% by volume of hydrogen gas. Thus, intended magnetic powder (N) was obtained. Measurement of its magnetic characteristics gave the following results: $H_c=602$ Oe, $T_p=80\%$.

On the magnetic powder I–N obtained in Examples 6–10 and Comparative Example 5, coercivity was measured by a conventional method. Further, according to the same recipe as employed in Examples 1–3 and Comparative Examples 1–2, a formulation was prepared therefrom. The formulation was kneaded by means of a ball mill to obtain a magnetic coating material.

Subsequently, by a conventional method, each magnetic coating material was coated on a polyester film, oriented and dried to produce a magnetic tape having a magnetic coating film with a thickness of about 9μ. On each of the tapes, coercivity ($H_c$), squareness ($B_r/B_m$), orientability (OR) and remanent induction ($B_m$) were measured to obtain the results shown in Table 4.

TABLE 4

| | Sample No. | Measurements on tape | | | |
|---|---|---|---|---|---|
| | | $H_c$ (Oe) | $B_r/B_m$ | OR | $B_m$ (Gauss) |
| Example 6 | I | 500 | 0.85 | 2.35 | 1,597 |
| Example 7 | J | 522 | 0.85 | 2.30 | 1,667 |
| Example 8 | K | 551 | 0.84 | 2.28 | 1,681 |
| Comparative Example 5 | L | 435 | 0.85 | 2.38 | 1,579 |
| Example 9 | M | 537 | 0.85 | 2.19 | 1,642 |
| Example 10 | N | 592 | 0.84 | 2.14 | 1,667 |

EXAMPLE 11

A slurry was prepared by dispersing 100 g of acicular $\gamma$-Fe$_2$O$_3$ [coercivity ($H_c$): 341 Oe] into 1 liter of water. After adding 88 ml of a solution containing 5 moles/liter of sodium hydroxide, a mixture of 60 ml of a solution containing 1 mole/liter of cobalt sulfate and 125 ml of a solution containing 1 mole/liter of ferrous sulfate was added over a time period of one hour while blowing nitrogen gas into the dispersion. Then, stirring was continued at room temperature (28° C.) for 5 hours. After the reaction, the slurry was filtered and washed with water, and the wet cake thus obtained was placed in an autoclave together with water placed in another vessel. After replacing the inner atmosphere of the autoclave with nitrogen gas and sealing, and the cake was treated under saturated water vapor pressure at 125° C. for 12 hours. Then, the treated material was placed in a tube furnace and heat-treated at 150° C. for 2 hours while blowing nitrogen gas. Thus, the intended magnetic powder (O) was obtained.

EXAMPLE 12

Intended magnetic powder (P) was produced in accordance with the same procedure as in Example 11, except that, after the treatment under saturated water vapor pressure, the material was dried at 60° C. for 12 hours and then the treated material was heat-treated at 170° C. for 2 hours while blowing nitrogen gas.

On the magnetic powder obtained in Examples 11 and 12, coercivity was measured by a conventional method. Then, magnetic coating materials were prepared therefrom in accordance with the same procedure as in Examples 1–3 or Comparative Examples 1–2, from which magnetic tapes were prepared in the same manner as above. On each of the tapes, coercivity ($H_c$), squareness ($B_r/B_m$), orientability (OR) and remanent induction ($B_m$) were measured by conventional methods to obtain the results shown in Table 5.

TABLE 5

|  | Sample No. | Measurements on powder $H_c$ (Oe) | Measurements on tape | | | |
|---|---|---|---|---|---|---|
|  |  |  | $H_c$ (Oe) | $B_r/B_m$ | OR | $B_m$ (Gauss) |
| Example 11 | O | 701 | 703 | 0.83 | 2.00 | 1,668 |
| Example 12 | P | 720 | 735 | 0.83 | 1.99 | 1,614 |

What is claimed is:

1. A process for producing a cobalt containing ferromagnetic iron oxide, which comprises treating magnetic iron oxide particles with a cobalt salt solution and an alkali or with a cobalt salt solution, a ferrous salt solution and an aklali to coat a cobalt compound or a cobalt compound and a ferrous compound on the surface of the particles the alkali being present at least in an amount equivalent to the cobalt salt or the cobalt and ferrous salts, the amount of cobalt coated being about 0.5–30% by weight based on the iron oxide, the amount of ferrous iron coated being about 1–30% by weight based on the iron oxide and said treating being effected in a non-oxidative atmosphere; separating the coated particles from the dispersion containing them and then heating the coated particles at a temperature of 60°–300° C. in an atmosphere in which the partial pressure of water vapor is at least 0.2 atm., said cobalt containing ferromagnetic iron oxide exhibiting a higher coercivity than a cobalt containing ferromagnetic iron oxide prepared as above absent said heating at a temperature of 60°–300° C. in an atmosphere in which the partial pressure of water vapor is at least 0.2 atm.

2. The process according to claim 1, wherein an additional heating is carried out at a temperature of 100°–300° C. in an inert gas atmosphere.

3. The process according to claim 1, wherein an additional heating is carried out at a temperature of 130°–250° C. in an inert gas atmosphere.

4. The process according to claim 1, wherein the heating is carried out at a temperature of 60°–250° C.

5. The process according to claim 1, wherein the heating is carried out at a temperature of 80°–180° C.

6. The process according to claim 1, wherein the heating is carried out at a temperature of 80°–150° C.

7. The process according to claim 1, wherein the heating is carried out in an atmosphere in which the partial pressure of water vapor is 0.4 atm. or more.

8. The process according to claim 1, wherein the heating is carried out at said temperature under a saturated water vapor pressure.

* * * * *